(12) United States Patent
Gong et al.

(10) Patent No.: US 11,043,980 B2
(45) Date of Patent: Jun. 22, 2021

(54) METHOD FOR CONTROLLING EARPHONE SWITCHING, EARPHONE, AND EARPHONE SYSTEM

(71) Applicant: Guangdong Oppo Mobile Telecommunications Corp., Ltd., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/459,223

(22) Filed: Jul. 1, 2019

(65) Prior Publication Data

US 2020/0007977 A1 Jan. 2, 2020

(30) Foreign Application Priority Data

Jul. 2, 2018 (CN) .......................... 201810709497.2

(51) Int. Cl.
*H04B 1/3827* (2015.01)
*H04R 1/10* (2006.01)
(Continued)

(52) U.S. Cl.
CPC ......... *H04B 1/3827* (2013.01); *H04R 1/1041* (2013.01); *H04R 29/001* (2013.01);
(Continued)

(58) Field of Classification Search
None
See application file for complete search history.

(56) References Cited

U.S. PATENT DOCUMENTS

| | | | |
|---|---|---|---|
| 2009/0154720 A1 | 6/2009 | Oki | |
| 2010/0020982 A1* | 1/2010 | Brown | ................. H04R 1/1041 381/74 |

(Continued)

FOREIGN PATENT DOCUMENTS

| | | |
|---|---|---|
| CN | 104185109 A | 12/2014 |
| CN | 105101016 A | 11/2015 |

(Continued)

OTHER PUBLICATIONS

International search report issued in corresponding international application No. PCT/CN2019/093111 dated Aug. 29, 2019.

(Continued)

*Primary Examiner* — Antim G Shah

(57) ABSTRACT

A method for controlling earphone switching, an earphone, and an earphone system are provided. The method includes the following. A first earphone determines whether the first earphone is switched to a non-wearing state from a wearing state. The first earphone is coupled with a second earphone and an electronic device and serves as a master earphone, and the second earphone serves as a slave earphone. When the first earphone is determined to be switched to the non-wearing state from the wearing state, the first earphone switches the first earphone to serve as the slave earphone and the first earphone switches the second earphone to serve as the master earphone. Switching between master and slave earphones can be achieved according to changes between the wearing state and the non-wearing state of the master earphone, such that user experience can be improved.

18 Claims, 6 Drawing Sheets

(51) Int. Cl.
*H04R 29/00* (2006.01)
*H04W 36/00* (2009.01)
*H04M 1/02* (2006.01)
*H04R 5/033* (2006.01)

(52) U.S. Cl.
CPC ...... *H04W 36/0027* (2013.01); *H04M 1/0258* (2013.01); *H04R 1/1016* (2013.01); *H04R 5/033* (2013.01); *H04R 2420/03* (2013.01); *H04R 2420/07* (2013.01)

(56) References Cited

U.S. PATENT DOCUMENTS

| | | | | |
|---|---|---|---|---|
| 2012/0207317 | A1* | 8/2012 | Abdollahzadeh Milani | G10K 11/175 381/71.6 |
| 2012/0230510 | A1* | 9/2012 | Dinescu | H04R 5/033 381/80 |
| 2014/0146976 | A1* | 5/2014 | Rundle | H04R 1/1083 381/71.6 |
| 2017/0264987 | A1* | 9/2017 | Hong | H04R 1/1025 |
| 2017/0311105 | A1* | 10/2017 | Hariharan | H04R 29/001 |
| 2018/0132028 | A1* | 5/2018 | Nakai | H04R 5/04 |
| 2018/0302706 | A1* | 10/2018 | Sanders | G06F 3/011 |

FOREIGN PATENT DOCUMENTS

| | | |
|---|---|---|
| CN | 106878921 A | 6/2017 |
| CN | 106937197 A | 7/2017 |
| CN | 206350153 U | 7/2017 |
| CN | 106998511 A | 8/2017 |
| CN | 107071618 A | 8/2017 |
| CN | 107145330 A | 9/2017 |
| CN | 107493531 A | 12/2017 |
| EP | 3101910 A1 | 12/2016 |
| WO | 2017184976 A1 | 10/2017 |

OTHER PUBLICATIONS

Extended European search report issued in corresponding European application No. 19183606.3 dated Nov. 27, 2019.
Examination report issued in corresponding European application No. 19183606.3 dated Mar. 16, 2021.
First Examination Report issued in corresponding Indian Application No. 201914025573 dated Feb. 3, 2021.

* cited by examiner

METHOD FOR CONTROLLING EARPHONE SWITCHING, EARPHONE, AND EARPHONE SYSTEM

CROSS-REFERENCE TO RELATED APPLICATION(S)

This application claims priority to Chinese Patent Application No. 201810709497.2, filed on Jul. 2, 2018, the disclosure of which is hereby incorporated by reference in its entirety.

TECHNICAL FIELD

This disclosure relates to the field of electronic technology, and more particularly to a method for controlling earphone switching, an earphone, and an earphone system.

BACKGROUND

With the development of wireless technology, a scenario in which wireless earphones are coupled with electronic devices such as mobile phones through wireless technology is becoming increasingly prevalent. Functions such as listening to music, making a call, etc. can be realized with the wireless earphones. However, existing wireless earphones are unable to support master-slave switching, which provides poor experience for users.

SUMMARY

According to embodiments of the present disclosure, a method for controlling earphone switching, an earphone, and an earphone system are provided.

In a first aspect of the present disclosure, a method for controlling earphone switching is provided. The method includes the following. A first earphone determines whether the first earphone is switched to a non-wearing state from a wearing state. The first earphone is coupled with a second earphone and an electronic device and serves as a master earphone, and the second earphone serves as a slave earphone. The first earphone switches the first earphone to serve as the slave earphone and switches the second earphone to serve as the master earphone, in response to determining that the first earphone is switched to the non-wearing state from the wearing state.

In a second aspect of the present disclosure, an earphone is provided. The earphone includes at least one processor and a computer readable storage. The computer readable storage is coupled to the at least one processor and stores at least one computer executable instruction thereon which, when executed by the at least one processor, causes the at least one processor to carry out following actions. Whether the earphone is switched to a non-wearing state from a wearing state is determined. The earphone is coupled with the other earphone and an electronic device and serves as a master earphone, and the other earphone serves as a slave earphone. The earphone is switched to serve as the slave earphone and the other earphone is switched to serve as the master earphone, in response to determining that the earphone is switched to the non-wearing state from the wearing state.

In a third aspect of the present disclosure, an earphone system is provided. The earphone system includes a first earphone and a second earphone with only one of them being capable of coupling with an electronic device at a time. The first earphone is currently coupled with the electronic device and the second earphone. The first earphone includes at least one processor and a computer readable storage. The computer readable storage is coupled to the at least one processor and stores at least one computer executable instruction thereon which, when executed by the at least one processor, causes the at least one processor to: determine whether the first earphone is switched to a non-wearing state from a wearing state; and disconnect a first data transmission link between the first earphone and the electronic device and establish a second data transmission link between the second earphone and the electronic device, in response to determining that the first earphone is switched to the non-wearing state from the wearing state.

BRIEF DESCRIPTION OF THE DRAWINGS

In order to describe technical solutions of embodiments of the present disclosure or the related art more clearly, the following will give a brief description of accompanying drawings used for describing the embodiments of the present disclosure or the related art. Apparently, accompanying drawings described below are merely some embodiments of the present disclosure. Those of ordinary skill in the art can also obtain other accompanying drawings based on the accompanying drawings described below without creative efforts.

DETAILED DESCRIPTION

Figure 1A:
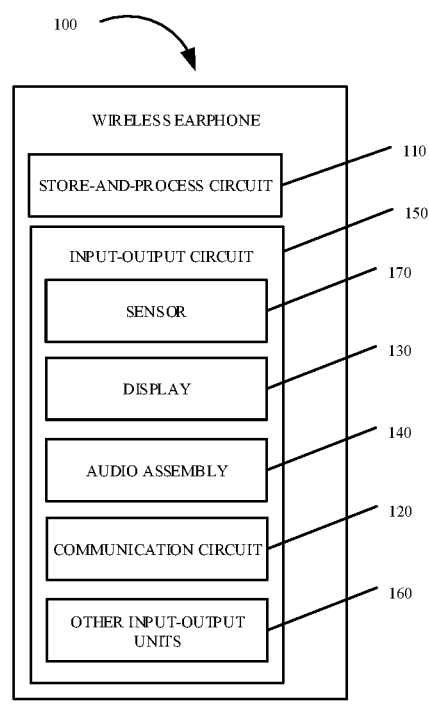
FIG. 1A is a schematic structural diagram illustrating a wireless earphone according to an embodiment of the present disclosure.

In order for those skilled in the art to better understand technical solutions of the present disclosure, technical solutions of embodiments of the present disclosure will be described clearly and completely with reference to accompanying drawings in the embodiments of the present disclosure. Apparently, embodiments described hereinafter are merely some embodiments, rather than all embodiments, of the present disclosure. All other embodiments obtained by those of ordinary skill in the art based on the embodiments of the present disclosure without creative efforts shall fall within the protection scope of the present disclosure.

Detailed description will be given below.

The terms "first", "second", "third", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "embodiment" referred to herein means that a particular feature, structure, or character described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is explicitly and implicitly understood by those skilled in the art that an embodiment described herein may be combined with other embodiments.

An electronic device may include various handheld devices, in-vehicle devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as the electronic device.

In embodiments of the present disclosure, a first earphone and a second earphone are both wireless earphones and can be taken as a pair of earphones after successful pairing. Communication between the wireless earphone and the electronic device can be conducted through the following technologies: wireless fidelity (Wi-Fi), Bluetooth, visible light communication, invisible light communication (such as infrared communication and ultraviolet communication), and the like. In the embodiments, the first earphone can serve as a master earphone, the second earphone can serve as a slave earphone, and a first data transmission link is established between the master earphone and the electronic device. Data transmission between the wireless earphone and the electronic device is conducted via the first data transmission link. The slave earphone does not communicate initiatively with the electronic device. Pairing between the master earphone and the slave earphone can be achieved through Bluetooth, to further achieve communication between the master earphone and the slave earphone.

In an embodiment, the wireless earphone can be ear hook earphones, earbuds, or over-ear/on-ear earphones, which is not limited herein.

The wireless earphone can be accommodated in an earphone case. The earphone case can include two receive cavities (i.e., a first receive cavity and a second receive cavity) and one or more magnetic components which are in the earphone case. The two receive cavities are designed for receiving a pair of wireless earphones (i.e., the first earphone and the second earphone) both in size and shape. The one or more magnetic components are configured to attract and fix magnetically the pair of wireless earphones in the two receive cavities respectively. The earphone case can further include a cover. In terms of size and shape, the first receive cavity is designed for receiving the first earphone, and the second receive cavity is designed for receiving the second earphone.

The wireless earphone can include an earphone housing, a rechargeable battery (such as a lithium battery) accommodated in the earphone housing, multiple metal contacts for coupling the rechargeable battery with a charging device, and a speaker assembly including a driver unit and a directional voice port. The driver unit includes a magnetic body, a voice coil, and an isolation membrane. The driver unit is configured to make a sound from the directional voice port. The multiple metal contacts are arranged on an outer surface of the earphone housing.

In an embodiment, the wireless earphone further includes a touch area. The touch area is located on the outer surface of the earphone housing. The touch area is provided with at least one touch sensor to detect touch operations. The touch sensor can include a capacitive sensor. When the touch area is touched by a user, at least one capacitive sensor will detect its own change in capacitance, thereby recognizing touch operations.

In an embodiment, the wireless earphone further includes an acceleration sensor and a three-axis gyroscope. The acceleration sensor and the three-axis gyroscope are accommodated in the earphone housing to recognize a pick-up operation and a take-out operation of the wireless earphone.

In an embodiment, the wireless earphone further includes at least one barometric pressure sensor. The barometric pressure sensor is disposed on the outer surface of the earphone housing and is configured to detect barometric pressure in an ear after the wireless earphone is put on. Thus, tightness of an earphone in a wearing state can be detected with the barometric pressure sensor. When the wireless earphone is detected to be loosely worn, the wireless earphone can send prompt information to an electronic device coupled with the wireless earphone, to remind a user that the wireless earphone has a risk of falling off.

Hereinafter, embodiments of the present disclosure will be described in detail.

According to an embodiment of the disclosure, a method for controlling earphone switching is provided. The method includes the following. A first earphone determines whether the first earphone is switched to a non-wearing state from a wearing state. The first earphone is coupled with a second earphone and an electronic device and serves as a master earphone, and the second earphone serves as a slave earphone. The first earphone switches the first earphone to serve as the slave earphone and switches the second earphone to serve as the master earphone, in response to determining that the first earphone is switched to the non-wearing state from the wearing state.

According to an embodiment of the disclosure, an earphone is provided. The earphone includes at least one processor and a computer readable storage. The computer readable storage is coupled to the at least one processor and stores at least one computer executable instruction thereon which, when executed by the at least one processor, causes the at least one processor to carry out following actions. Whether the earphone is switched to a non-wearing state from a wearing state is determined. The earphone is coupled with the other earphone and an electronic device and serves as a master earphone, and the other earphone serves as a slave earphone. The earphone is switched to serve as the slave earphone and the other earphone is switched to serve as the master earphone, in response to determining that the earphone is switched to the non-wearing state from the wearing state.

According to an embodiment of the disclosure, an earphone system is provided. The earphone system includes a first earphone and a second earphone with only one of them being capable of coupling with an electronic device at a time. The first earphone is currently coupled with the electronic device and the second earphone. The first earphone includes at least one processor and a computer readable storage. The computer readable storage is coupled to the at least one processor and stores at least one computer executable instruction thereon which, when executed by the at least one processor, causes the at least one processor to: determine whether the first earphone is switched to a non-wearing state from a wearing state; and disconnect a first data transmission link between the first earphone and the electronic device and establish a second data transmission link between the second earphone and the electronic device, in response to determining that the first earphone is switched to the non-wearing state from the wearing state.

Embodiments of the disclosure will be detailed below with reference to the accompanying drawings.

FIG. 1A is a schematic structural diagram illustrating a wireless earphone according to an embodiment of the present disclosure. As illustrated in FIG. 1A, a wireless earphone 100 includes a store-and-process circuit 110 and a sensor 170 coupled with the store-and-process circuit 110.

The wireless earphone 100 can include a control circuit. The control circuit can include the store-and-process circuit 110. The store-and-process circuit 110 may be a memory, such as a hard drive memory, a non-transitory memory (such as a flash memory, other electronically programmable read-only memories used to form a solid-state drive, or the like), a transitory memory (such as a static random access memory, dynamic random access memory, or the like), or the like, which is not limited herein. The store-and-process circuit 110 has a processing circuit to control operations of the wireless earphone 100. The processing circuit can be implemented based on one or more microprocessors, microcontrollers, digital controllers for switching between earphones, baseband processors, power management units, audio codec chips, application-specific integrated circuits, display driver integrated circuits, or the like.

The store-and-process circuit 110 can be configured to run software of the wireless earphone 100, such as an Internet browsing application, a voice over Internet protocol (VOIP) phone call application, an email application, a media playback application, an operating system function, and the like. The software may be used to perform some control operations, such as camera-based image collection, ambient light sensor-based ambient light measurements, proximity sensor-based proximity state measurements, information display function based on status indicators such as status indicator lamps of light-emitting diodes (LEDs), touch sensor-based touch event detection, functions associated with displaying information on multiple (e.g., layered) displays, operations associated with implementing wireless communication functions, operations associated with collecting and generating audio signals, control operations associated with collecting and processing button-press event data, and other functions of the wireless earphone 100, which is not limited herein.

The wireless earphone 100 can further include an input-output circuit 150. The input-output circuit 150 can be configured to achieve data input and data output of the wireless earphone 100, that is, to allow the wireless earphone 100 to receive data from an external device and also allow the wireless earphone 100 to output data to an external device. The input-output circuit 150 can include a sensor 170. The sensor 170 may include an ambient light sensor, an optical or capacitive proximity sensor, a touch sensor (e.g., based on an optical touch sensor and/or a capacitive touch sensor, where the touch sensor may be a part of a touch display screen or may be used independently as a touch sensor structure), an acceleration sensor, and other sensors.

The input-output circuit 150 can further include one or more display devices, such as a display 130. The display 130 may include one or more of a liquid crystal display, an organic light emitting diode (OLED) display, an electronic ink display, a plasma display, displays based on other display technologies. As an embodiment, the display 130 includes an array of touch sensors (i.e., the display device can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and embodiments of the present disclosure are not particularly restricted.

An audio assembly 140 is configured to provide the wireless earphone 100 with audio input and output functions. The audio assembly 140 of the wireless earphone 100 may include speakers, microphones, buzzers, tone generators, and other assemblies for generating and detecting sound.

A communication circuit 120 is configured to provide the wireless earphone 100 with the ability to communicate with external devices. As an embodiment, the communication circuit 120 includes analog/digital input-output interface circuits and wireless communication circuits based on radio frequency signals and/or optical signals. The wireless communication circuit of the communication circuit 120 may include a radio frequency transceiver circuit, a power amplifier circuit, a low-noise amplifier, a switch, a filter, and an antenna. As an example, the wireless communication circuit of the communication circuit 120 includes a circuit for supporting near field communication (NFC) by transmitting and receiving near field coupled electromagnetic signals. Specifically, the communication circuit 120 includes an NFC antenna and an NFC transceiver. As another embodiment, the communication circuit 120 further includes transceivers and antennas for cellular telephone, transceiver circuits and antennas for wireless local area network, and the like.

The wireless earphone 100 can further include a battery (not illustrated), a power management circuit (not illustrated), and other input-output units 160. The other input-output units 160 include but are not limited to buttons and other status indicators.

An instruction can be input by a user via the input-output circuit 150 to control operations of the wireless earphone 100, and state information and other outputs can be received from the wireless earphone 100 with the input-output circuit 150 outputting data.

Figure 1B:
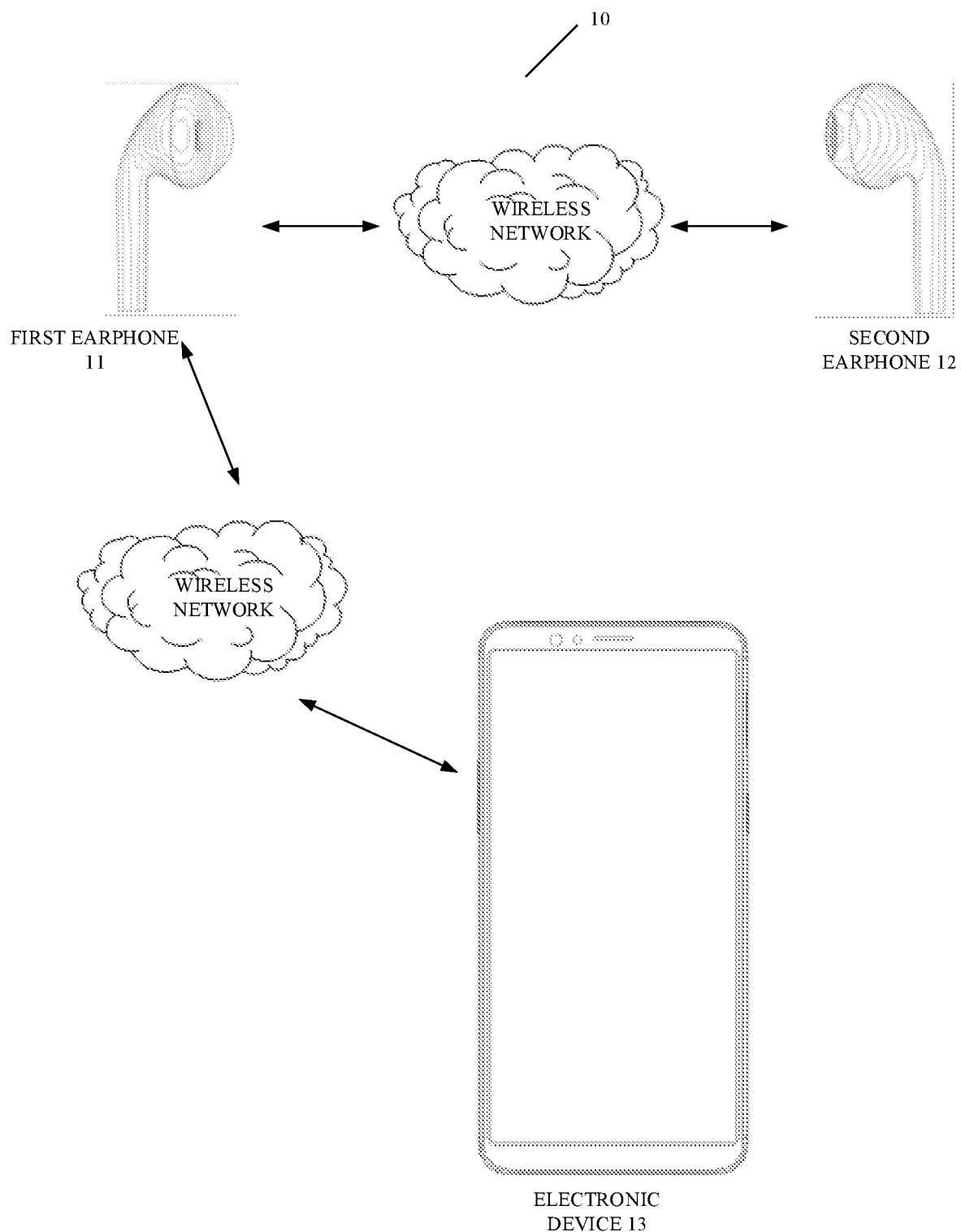
FIG. 1B is a schematic diagram illustrating an earphone system for performing a method for controlling earphone switching according to an embodiment of the present disclosure.

FIG. 1B is a schematic diagram illustrating an earphone system 10 for performing a method for controlling earphone switching according to an embodiment of the present disclosure. The wireless earphone illustrated in FIG. 1A is applicable to the earphone system 10 illustrated in FIG. 1B. The earphone system 10 relates to a first earphone 11, a second earphone 12, and an electronic device 13. The first earphone 11 serves as the master earphone and the second earphone 12 serves as the slave earphone for example. The master earphone refers to an earphone that currently in communication with the electronic device via a data transmission link established with the electronic device for example, and the slave earphone refers to an earphone that does not currently in communication with the electronic device. At a time point, only one earphone can communicate with the electronic device via the data transmission link established there between. In this embodiment, a first data transmission link is established between the first earphone 11 and the electronic device 13 via a wireless network, and the wireless network can be Wi-Fi, Bluetooth, visible light communication, invisible light communication (infrared communication and ultraviolet communication), or the like. Based on the first data transmission link, data transmission (such as voice data, image data, video data, etc.) can be conducted between the first earphone 11 and the electronic device 13. Also, the first earphone 11 and the second earphone 12 can communicate with each other via a wireless network, and the wireless network can be Bluetooth, infrared, etc.

The earphone system 10 includes the first earphone 11 and the second earphone 12 with only one of them being capable of coupling with the electronic device 13 at a time. The term "first" and "second" are used herein to distinguish one earphone from another, however, the earphones are the same in terms of structure even though they play different roles in the system. Therefore, the first earphone can be treated as the master phone and accordingly, the second earphone can be treated as the slave earphone. The first earphone 11 is currently coupled with the electronic device 13 and the second earphone 12. That is, the first earphone is treated as the master phone and accordingly, the second earphone is treated as the slave earphone. The first earphone 11 includes at least one processor and a computer readable storage. The computer readable storage is coupled to the at least one processor and stores at least one computer executable instruction thereon which, when executed by the at least one processor, causes the at least one processor to: determine whether the first earphone 11 is switched to a non-wearing state from a wearing state; and disconnect a first data transmission link between the first earphone 11 and the electronic device 13 and establish a second data transmission link between the second earphone 12 and the electronic device 13, in response to determining that the first earphone 11 is switched to the non-wearing state from the wearing state.

It should be understood that implementation process will not be detailed herein and reference may be made to the following method implementations.

As such, the wearing state or the non-wearing state of the master earphone can be detected, and earphone switching can be achieved according to the changes between these two states.

Figure 2:
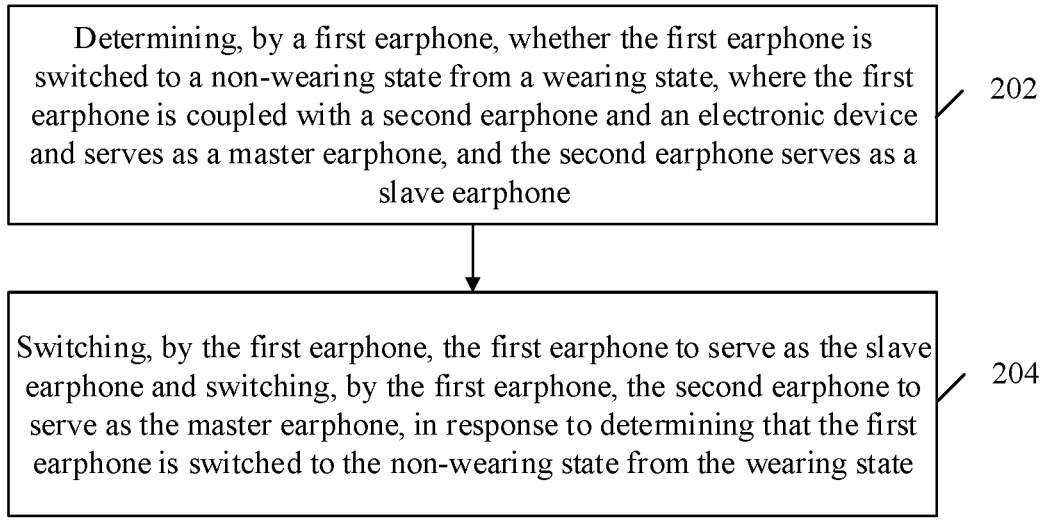
FIG. 2 is a schematic flowchart illustrating a method for controlling earphone switching according to an embodiment of the present disclosure.

FIG. 2 is a schematic flowchart illustrating a method for controlling earphone switching according to an embodiment of the present disclosure. The method is applicable to the wireless earphone illustrated in FIG. 1A and the earphone system illustrated in FIG. 1B. As illustrated in FIG. 2, the method includes the following.

At 202, a first earphone determines whether the first earphone is switched to a non-wearing state from a wearing state, where the first earphone is coupled with a second earphone and an electronic device and serves as a master earphone, and the second earphone serves as a slave earphone.

At 204, when determining that the first earphone is switched to the non-wearing state from the wearing state, the first earphone switches the first earphone to serve as the slave earphone and switches the second earphone to serve as the master earphone.

As such, earphone switching can be achieved according to the changes between these two states.

Figure 3A:
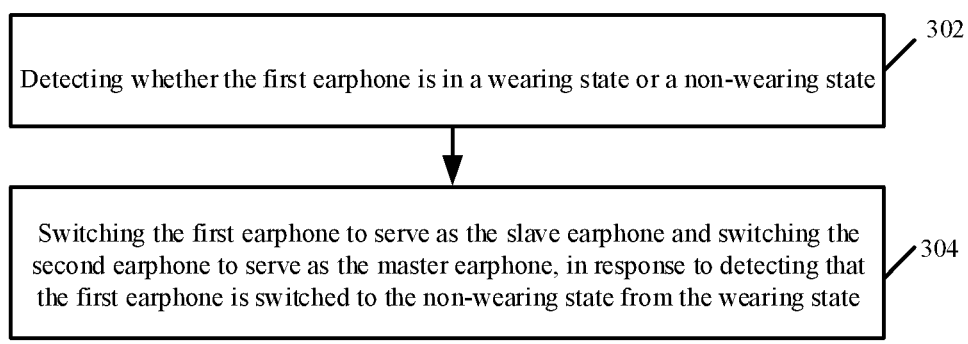
FIG. 3A is a schematic flowchart illustrating a method for controlling earphone switching according to an embodiment of the present disclosure.

FIG. 3A is a schematic flowchart illustrating a method for controlling earphone switching according to an embodiment of the present disclosure. The method is applicable to the wireless earphone illustrated in FIG. 1A and the earphone system illustrated in FIG. 1B. As illustrated in FIG. 3A, the method includes the following.

At 302, whether the first earphone is in a wearing state or a non-wearing state is detected.

The first earphone serves as the master earphone and detects whether itself is in the wearing state or the non-wearing state. As an embodiment, the first earphone detects whether the first earphone itself is in the wearing state or the non-wearing state with a proximity sensor or an ultrasonic sensor. The second earphone is in the wearing state.

In an embodiment, whether the first earphone is in the wearing state or the non-wearing state is detected at 302 as follows.

At A11, acceleration data is acquired with an acceleration sensor.

At A12, when the acceleration data satisfies a preset condition, the first earphone is determined to be in the non-wearing state.

At A13, when the acceleration data does not satisfy the preset condition, the first earphone is determined to be in the wearing state.

The preset condition herein may be set by a user or by default. The first earphone can be equipped with the acceleration sensor. The acceleration data is acquired with the acceleration sensor. A pick-up operation or a take-out operation of the user can be detected via the acceleration data. When the acceleration data satisfies the preset condition, determine that the first earphone is in the non-wearing state. When the acceleration data does not satisfy the preset condition, determine that the first earphone is in the wearing state.

In an embodiment, whether the first earphone is in the wearing state or the non-wearing state is detected at 302 as follows.

At A21, a distance between the first earphone and a user's ear is detected with a sensor.

At A22, upon detecting that the distance is shorter than a preset distance, the first earphone is determined to be in the wearing state.

At A23, upon detecting the distance is longer than or equal to the preset distance, the first earphone is determined to be in the non-wearing state.

The preset distance herein may be set by a user or by default. The sensor used at A21 can be a proximity sensor or an ultrasonic sensor. The distance between the first earphone and the user's ear can be detected with the sensor. When the distance is shorter than a preset distance, determine that the first earphone is in the wearing state. When the distance is longer than or equal to the preset distance, determine that the first earphone is in the non-wearing state.

In an embodiment, whether the first earphone is in the wearing state or the non-wearing state is detected at 302 as follows.

At A31, a degree of fit between the first earphone and a user's ear is determined.

At A32, when the degree of fit is smaller than a preset threshold, the first earphone is determined to be in the wearing state.

At A33, when the degree of fit is greater than or equal to the preset threshold, the first earphone is determined to be in the non-wearing state.

In this embodiment, the degree of fit refers to a degree to which a wireless earphone fits the user's ear and can be represented by a specific numeric value. The wireless earphone can be provided with a sensor. The sensor is configured to detect a degree of fit between the wireless earphone and the user's ear. The sensor can include at least one of a pressure sensor, a barometric pressure sensor, an ultrasonic sensor, a proximity sensor, etc. The preset threshold above can be set by a user or by default. The first earphone detects the degree of fit between the first earphone and the user's ear with the sensor. When the degree of fit is smaller than the preset threshold, determine that the first earphone is in the wearing state. When the degree of fit is greater than or equal to the preset threshold, determine that the first earphone is in the non-wearing state.

In practice, a volume of the wireless earphone is taken as an example for illustration. The more tightly the wireless earphone fits the user's ear, the louder a voice sounds. The more loosely the wireless earphone fits the user's ear, the lower the voice sounds. As such, if the voice sounds low, the wireless earphone can be considered to be in the non-wearing state. In this case, switching between earphones can be conducted, to ensure phone call or other types of data transmission.

In an embodiment, the first earphone includes a pressure sensor, and the degree of fit between the first earphone and the user's ear is determined at A31 as follows.

At B11, a pressure value between the first earphone and the user's ear is detected.

At B12, according to a preset mapping relationship between pressure values and degrees of fit, the degree of fit corresponding to the pressure value is determined.

As an embodiment, at least one pressure sensor can be provided at a portion of the first earphone where the first earphone in contact with the user's ear. The at least one pressure sensor can detect a pressure value between the first earphone and the user's ear. The pressure value may be a pressure value detected by any one of the at least one pressure sensor, an average pressure value of all pressure values detected by the at least one pressure sensor, a maximum pressure value detected by the at least one pressure sensor, a minimum pressure value detected by the at least one pressure sensor, or the like. A mapping relationship between pressure values and degrees of fit can be pre-stored in the first earphone and accordingly, the degree of fit corresponding to the pressure value can be determined according to the mapping relationship.

| pressure value | degree of fit |
| --- | --- |
| a~b | A1 |
| b~c | A2 |
| c~d | A3 |

In this embodiment, a<b<c<d, and A1, A2, and A3 are numbers greater than zero.

In an embodiment, the first earphone includes a barometric pressure sensor, and the degree of fit between the first earphone and the user's ear is determined at A31 as follows.

At B21, a barometric pressure value between the first earphone and the user's ear is detected.

At B22, according to a preset mapping relationship between barometric pressure values and degrees of fit, the degree of fit corresponding to the barometric pressure value is determined.

The first earphone includes the barometric pressure sensor. The barometric pressure value between the first earphone and the user's ear is detected with the barometric pressure sensor. A mapping relationship between barometric pressure values and degrees of fit can be pre-stored in the first earphone, whereby the degree of fit corresponding to the barometric pressure value can be determined according to the mapping relationship.

In an embodiment, the first earphone includes a first component and a second component, and the degree of fit between the first earphone and the user's ear is determined at A31 as follows.

At B31, a distance between the first earphone and the second earphone is determined.

At B32, according to a preset mapping relationship between distances and degrees of fit, a degree of fit corresponding to the distance is determined.

The first component may be a transmitter and the second component may be a receiver. As an embodiment, a pair of wireless earphones includes the first earphone and the second earphone. The first earphone is provided with an ultrasonic transmitter and the second earphone is provided with an ultrasonic receiver. In this case, the distance between the first earphone and the second earphone can be detected with the transmitter and the receiver. A mapping relationship between distances and degrees of fit can be pre-stored in the first earphone, such that the degree of fit corresponding to the distance is determined according to the mapping relationship.

At 304, when the first earphone is detected to be switched to the non-wearing state from the wearing state, the first earphone is switched to serve as the slave earphone and the second earphone is switched to serve as the master earphone.

In this embodiment, if a phone call is being made via the first earphone, conversation between speakers will not be heard when the first earphone is switched to the non-wearing state. Thus, the first earphone is switched to serve as the slave earphone and the second earphone is switched to serve as the master earphone.

In an embodiment, the method may further include the following after the operations at 304.

An operating parameter of the first earphone is adjusted.

In this embodiment, the operating parameter can include but is not limited to working power, working voltage, working current, volume, working mode, and the like, which is not limited herein. Take the volume as an example. When the first earphone is not worn by a user, the volume of the first earphone will be turned down. In this way, power consumption of the first earphone can be reduced to some extent. Alternatively, take the operating mode as an example. The first earphone can be switched to a low-power working mode from a high-power working mode.

In an embodiment, the method may further include the following after adjusting the operating parameter of the first earphone. Determine whether a parameter recovery instruction is received from the second earphone within a preset time period. Upon determining that the parameter recovery instruction is received, recover the operating parameter of the first earphone. Upon determining that no parameter recovery instruction is received, turn off the first earphone.

The preset time period can be set by a user or by default. After the second earphone is switched to serve as the master earphone, a notification message can be sent to the first earphone, to inform the first earphone that the second earphone has been switched to serve as the master earphone. The first earphone detects whether the parameter recovery instruction is received from the second earphone within the preset time period. When the parameter recovery instruction is received, recover the operating parameter of the first earphone. When no parameter recovery instruction is detected, turn off the first earphone.

For example, during phone call, the first earphone serves as a master earphone and the second earphone serves as a slave earphone. The first earphone detects in real time whether the first earphone is in a wearing state or a non-wearing state. When it is detected that the first earphone is taken out by a user, then no voice will be heard via the first earphone. Since only the master earphone is coupled with the electronic device and a phone call is made mainly via the master earphone, and the slave earphone is not coupled with the electronic device, no voice will be heard if the master earphone is not worn by the user. In this case, the first earphone will be switched to serve as the slave earphone, and the phone call is continued via the second earphone. Since the first earphone is not worn, a volume of the first earphone may be turned down or power of the first earphone may be reduced. As such, it is possible to reduce power consumption of the first earphone while ensuring continuity of the call.

In an embodiment, the method may further include the following after the operations at 304.

Upon detecting that the first earphone is switched to the wearing state from the non-wearing state, a switching request is sent to the second earphone to request the second earphone to disconnect a second data transmission link with the electronic device. A first data transmission link with the electronic device is established.

In this embodiment, after master-slave switching between the first earphone and the second earphone (that is, switching between master and slave earphones) is completed, the second earphone serves as the master earphone and the first earphone serves as the slave earphone. However, the first earphone can continue to detect whether the first earphone is in the wearing state or the non-wearing state. When the first earphone is switched to the wearing state from the non-wearing state, the first earphone sends the switching request to the second earphone to request the second earphone to disconnect the second data transmission link with the electronic device, and establishes the first data transmission link with the electronic device. As such, the first earphone is switched to serve as the master earphone, and the second earphone is switched to serve as the slave earphone.

In an embodiment, the first earphone is switched to serve as the slave earphone and the second earphone is switched to serve as the master earphone at 304 as follows.

A first data transmission link with the electronic device is disconnected, and a first request is sent to the second earphone to request the second earphone to establish a second data transmission link with the electronic device.

In this embodiment, the first earphone can disconnect initiatively the first data transmission link with the electronic device, and can send the first request to the second earphone to request the second earphone to establish the second data transmission link with the electronic device. As an example, the second earphone establishes the second data transmission link with the electronic device through Bluetooth technology.

In an embodiment, the first earphone is switched to serve as the slave earphone and the second earphone is switched to serve as the master earphone at 304 as follows.

A second request is sent to the electronic device to request the electronic device to establish a second data transmission link with the second earphone, and a first data transmission link with the electronic device is disconnected.

In this embodiment, the first earphone can send the second request to the electronic device to request the electronic device to establish the second data transmission link with the second earphone, and can disconnect the first data transmission link with the electronic device after sending the second request.

In an embodiment, the first earphone is switched to serve as the slave earphone and the second earphone is switched to serve as the master earphone at 304 as follows.

A third request is sent to the electronic device to request the electronic device to disconnect a first data transmission link with the first earphone, and to establish a second data transmission link with the second earphone.

In this embodiment, the first earphone sends the third request to the electronic device to request the electronic device to disconnect the first data transmission link with the first earphone and to instruct the electronic device to establish the second data transmission link with the second earphone.

As can be seen, according to the method for controlling earphone switching described above, whether the first earphone is in the wearing state or the non-wearing state is detected. When the first earphone is detected to be switched to the non-wearing state from the wearing state, the first earphone is switched to serve as the slave earphone and the second earphone is switched to serve as the master earphone. As such, the wearing state or the non-wearing state of the master earphone can be detected, and switching between master and slave earphones can be achieved according to switching between these two states, thereby improving user experience.

Figure 3B:
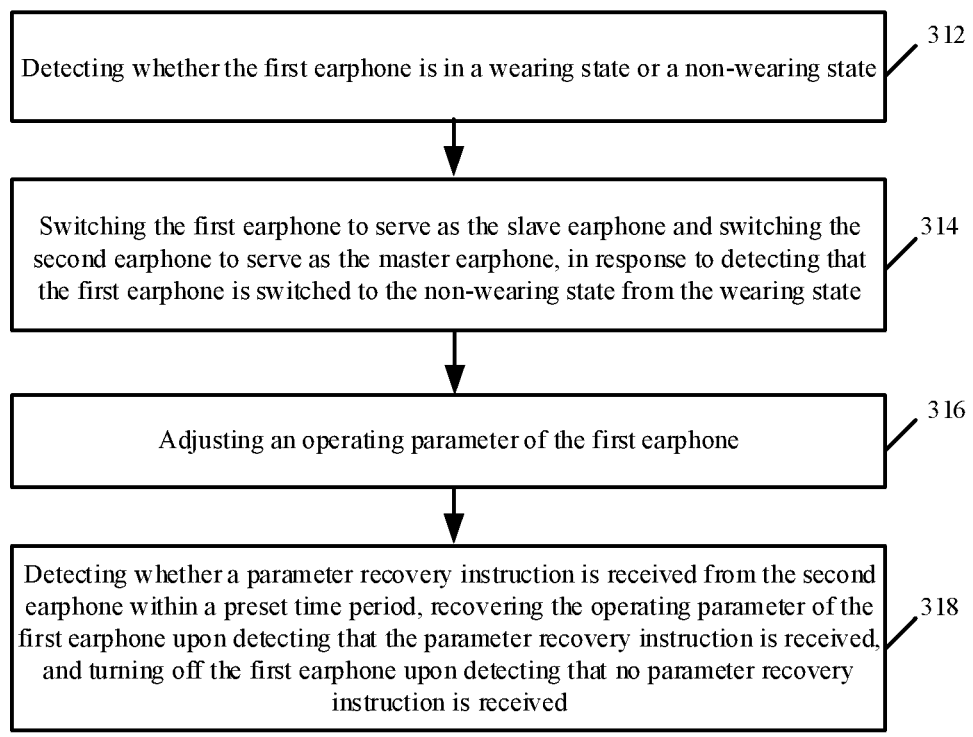
FIG. 3B is a schematic flowchart illustrating a method for controlling earphone switching according to another embodiment of the present disclosure.

Similar to the above embodiments, FIG. 3B is a schematic flowchart illustrating a method for controlling earphone switching according to another embodiment of the present disclosure. The method is applicable to the wireless earphone illustrated in FIG. 1A and the earphone system illustrated in FIG. 1B. The method includes the following.

At 312, a first earphone detects whether the first earphone is in a wearing state or a non-wearing state.

At 314, when the first earphone is detected to be switched to the non-wearing state from the wearing state, the first earphone is switched to serve as the slave earphone and a second earphone is switched to serve as the master earphone.

At 316, an operating parameter of the first earphone is adjusted.

At 318, determine whether a parameter recovery instruction is received from the second earphone within a preset time period, the operating parameter of the first earphone is recovered upon determining that the parameter recovery instruction is received, and the first earphone is turned off upon determining that no parameter recovery instruction is received.

For details of the operations at 312-318, reference can be made to the operations of the method for controlling earphone switching described in conjunction with FIG. 3A, which will not be repeated herein.

According to the method for controlling earphone switching of the above embodiment of the disclosure, whether the first earphone is in the wearing state or the non-wearing state can be detected. When the first earphone is detected to be switched to the non-wearing state from the wearing state, the first earphone is switched to serve as the slave earphone and the second earphone is switched to serve as the master earphone. The operating parameter of the first earphone is adjusted. Whether the parameter recovery instruction is received from the second earphone within a preset time period can be determined. When the parameter recovery instruction is received, the operating parameter of the first earphone is recovered. When no parameter recovery instruction is detected, the first earphone is turned off. As such, the wearing state or the non-wearing state of the master earphone can be detected, and switching between master and slave earphones can be achieved according to the changes between these two states. In addition, power consumption of the first earphone can be reduced by adjusting the operating parameter of the first earphone, which improves user experience.

Figure 3C:
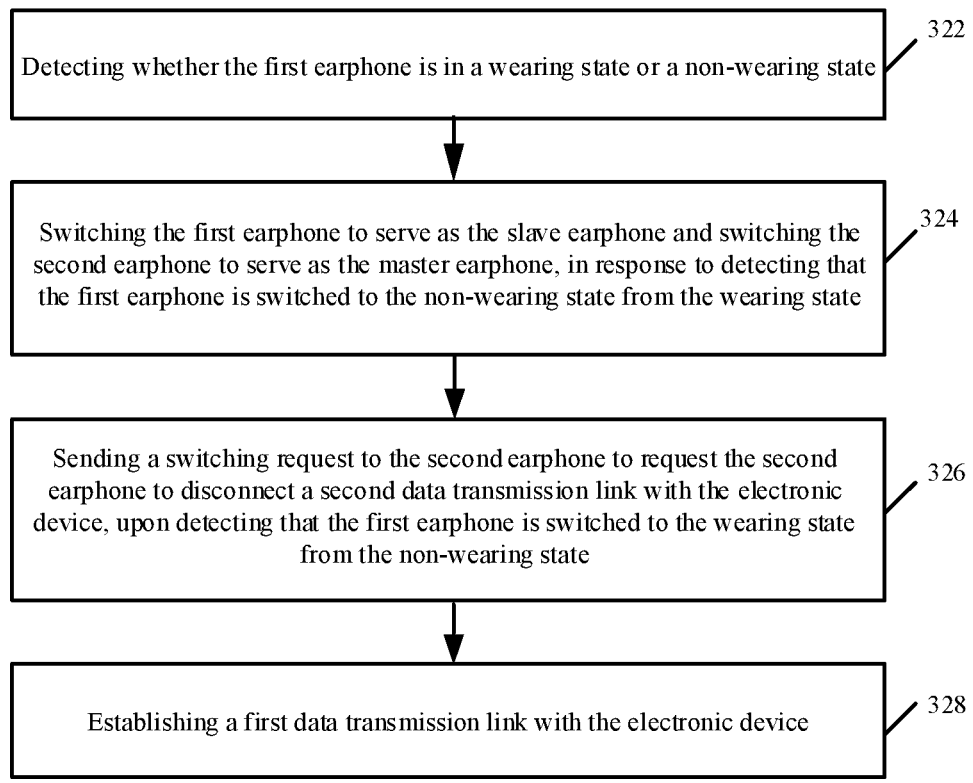
FIG. 3C is a schematic flowchart illustrating a method for controlling earphone switching according to yet another embodiment of the present disclosure.

Similar to the above embodiments, FIG. 3C is a schematic flowchart illustrating a method for controlling earphone switching according to yet another embodiment of the present disclosure. The method is applicable to the wireless earphone illustrated in FIG. 1A and the earphone system illustrated in FIG. 1B. The method includes the following.

At 322, whether a first earphone is in a wearing state or a non-wearing state is detected.

At 324, when the first earphone is detected to be switched to the non-wearing state from the wearing state, the first earphone is switched to serve as the slave earphone and a second earphone is switched to serve as the master earphone.

At 326, when the first earphone is detected to be switched to the wearing state from the non-wearing state, a switching request is sent to the second earphone to request the second earphone to disconnect a second data transmission link with the electronic device.

At 328, a first data transmission link with the electronic device is established.

For details of the operations at 322-328, reference can be made to the operations of the method for controlling earphone switching described in conjunction with FIG. 3A, which will not be repeated herein.

According to the method for controlling earphone switching of the above embodiment of the disclosure, whether the first earphone is in the wearing state or the non-wearing state can be detected. When the first earphone is switched to the non-wearing state from the wearing state, the first earphone is switched to serve as the slave earphone and the second earphone is switched to serve as the master earphone. When the first earphone is switched to the wearing state from the non-wearing state, the switching request is sent to the second earphone to request the second earphone to disconnect the second data transmission link with the electronic device. The first data transmission link with the electronic device is established. As such, the wearing state or the non-wearing state of the master earphone can be detected, and switching between master and slave earphones can be achieved according to the changes between these two states, and it is possible to improve user experience.

Figure 4:
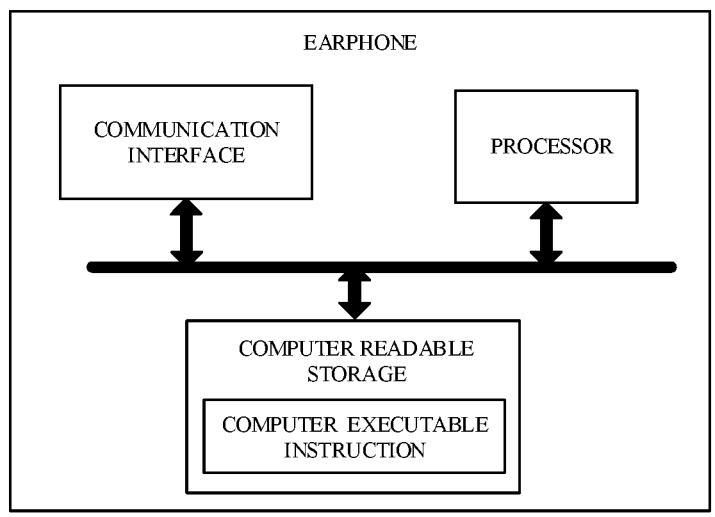
FIG. 4 is a schematic structural diagram illustrating a wireless earphone according to another embodiment of the present disclosure.

Similar to the above embodiments, FIG. 4 is a schematic structural diagram illustrating an earphone according to another embodiment of the present disclosure. As illustrated in FIG. 4, the earphone includes at least one processor, a computer readable storage (e.g., memory), and a communication interface. The earphone is a first earphone for example. The first earphone is applicable to the wireless earphone illustrated in FIG. 1A and the earphone system illustrated in FIG. 1B. The computer readable storage is coupled to the at least one processor and stores at least one computer executable instruction thereon which, when executed by the at least one processor, causes the at least one processor to carry out following actions. Whether the first earphone is switched to a non-wearing state from a wearing state is determined, where the first earphone is coupled with a second earphone and an electronic device and serves as a master earphone, and the second earphone serves as a slave earphone. When the first earphone is determined to be switched to the non-wearing state from the wearing state, switch the first earphone to serve as the slave earphone and switch a second earphone to serve as the master earphone.

With aid of the first earphone of the above embodiment of the disclosure, whether the first earphone is switched to the non-wearing state from the wearing state can be determined. When the first earphone is detected to be switched to the non-wearing state from the wearing state, the first earphone is switched to serve as the slave earphone and the second earphone is switched to serve as the master earphone. As such, switching between master and slave earphones can be achieved according to the changes between these two states, which improves user experience.

In an embodiment, in terms of switching the first earphone to serve as the slave earphone and switching the second earphone to serve as the master earphone, the at least one processor is configured to: disconnect a first data transmission link with the electronic device, and send a first request to the second earphone to request the second earphone to establish a second data transmission link with the electronic device.

In an embodiment, in terms of switching the first earphone to serve as the slave earphone and switching the second earphone to serve as the master earphone, the at least one processor is configured to: send a second request to the electronic device to request the electronic device to establish a second data transmission link with the second earphone, and disconnect a first data transmission link with the electronic device.

In an embodiment, in terms of switching the first earphone to serve as the slave earphone and switching the second earphone to serve as the master earphone, the at least one processor is configured to: send a third request to the electronic device to request the electronic device to disconnect a first data transmission link with the first earphone and to establish a second data transmission link with the second earphone.

In an embodiment, the at least one processor is further configured to detect whether the first earphone is in the wearing state or the non-wearing state. For example, the at least one processor is further configured to: acquire acceleration data; when the acceleration data satisfies a preset condition, determine that the first earphone is in the non-wearing state; when the acceleration data does not satisfy the preset condition, determine that the first earphone is in the wearing state.

In an embodiment, the at least one processor is further configured to detect whether the first earphone is in the wearing state or the non-wearing state. For example, the at least one processor is further configured to: detect a distance between the first earphone and a user's ear; upon detecting that the distance is shorter than a preset distance, determine that the first earphone is in the wearing state; upon detecting that the distance is longer than or equal to the preset distance, determine that the first earphone is in the non-wearing state.

In an embodiment, the at least one processor is further configured to adjust an operating parameter of the first earphone.

In an embodiment, the at least one processor is further configured to: determine whether a parameter recovery instruction is received from the second earphone within a preset time period; upon determining that the parameter recovery instruction is received, recover the operating parameter of the first earphone; upon determining that no parameter recovery instruction is received, turn off the first earphone.

In an embodiment, the at least one processor is further configured to: upon determining that the first earphone is switched to the wearing state from the non-wearing state, send a switching request to the second earphone to request the second earphone to disconnect a second data transmission link with the electronic device; establish a first data transmission link with the electronic device.

The foregoing technical solutions of embodiments of the disclosure are mainly described from a perspective of execution of the method. It can be understood that, in order to implement the above functions, the wireless earphone includes hardware structures and/or software modules for performing respective functions. Those of ordinary skill in the art will appreciate that units and algorithmic operations of various examples described in connection with embodiments herein can be implemented in hardware or a combination of computer software and hardware. Whether these functions are implemented by means of hardware or software depends on the particular application and the design constraints of the associated technical solution. For a specific application, those skilled in the art may use different methods to implement the described functionality, but such embodiment should not be regarded as beyond the scope of the disclosure.

In embodiments of the present disclosure, the wireless earphone can be divided into different functional units according to the above method embodiments. For example, the wireless earphone can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 5A:
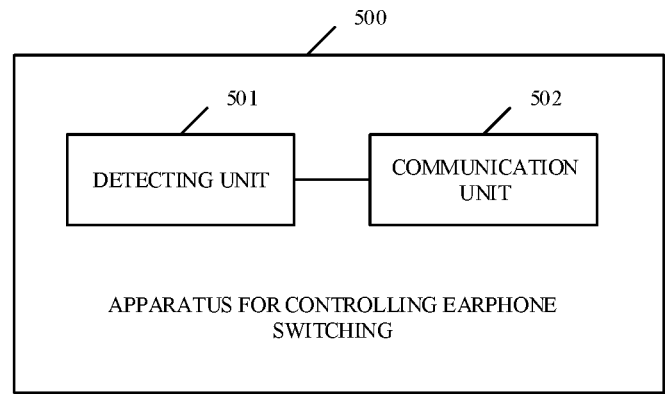
FIG. 5A is a schematic structural diagram illustrating an apparatus for controlling earphone switching according to an embodiment of the present disclosure.

FIG. 5A is a schematic structural diagram illustrating an apparatus 500 for controlling earphone switching according to an embodiment of the present disclosure. The apparatus 500 is applicable to the first earphone and the earphone system illustrated in FIG. 1B. As illustrated in FIG. 5A, the apparatus 500 includes a detecting unit 501 and a communication unit 502.

The detecting unit 501 is configured to detect whether the first earphone is switched to a non-wearing state from a wearing state. When the detecting unit 501 detects that the first earphone is switched to the non-wearing state from the wearing state, the communication unit 502 is configured to switch the first earphone to serve as the slave earphone and switch the second earphone to serve as the master earphone.

The apparatus for controlling earphone switching according to the above embodiment of the disclosure is applicable to the first earphone. Whether the first earphone is switched to the non-wearing state from the wearing state can be detected. When the first earphone is detected to be switched to the non-wearing state from the wearing state, the first earphone is switched to serve as the slave earphone and the second earphone is switched to serve as the master earphone. As such, switching between master and slave earphones can be achieved according to switching between these two states, such that user experience can be improved.

In an embodiment, for switching the first earphone to serve as the slave earphone and switching the second earphone to serve as the master earphone, the communication unit 502 is configured to: disconnect a first data transmission link with the electronic device and send a first request to the second earphone to request the second earphone to establish a second data transmission link with the electronic device.

In an embodiment, for switching the first earphone to serve as the slave earphone and switching the second earphone to serve as the master earphone, the communication unit 502 is configured to: send a second request to the electronic device to request the electronic device to establish a second data transmission link with the second earphone, and disconnect a first data transmission link with the electronic device.

In an embodiment, for switching the first earphone to serve as the slave earphone and switching the second earphone to serve as the master earphone, the communication unit 502 is configured to: send a third request to the electronic device to request the electronic device to disconnect a first data transmission link with the first earphone and to establish a second data transmission link with the second earphone.

In an embodiment, the first earphone includes an acceleration sensor. For detecting whether the first earphone is in the wearing state or the non-wearing state, the detecting unit 501 is configured to: acquire acceleration data with the acceleration sensor, determine that the first earphone is in the non-wearing state when the acceleration data satisfies a preset condition, and determine that the first earphone is in the wearing state when the acceleration data does not satisfy the preset condition.

In an embodiment, for detecting whether the first earphone is in the wearing state or the non-wearing state, the detecting unit 501 is configured to: detect, with a sensor, a distance between the first earphone and a user's ear, determine that the first earphone is in the wearing state upon detecting that the distance is shorter than a preset distance, and determine that the first earphone is in the non-wearing state upon detecting that the distance is longer than or equal to the preset distance.

Figure 5B:
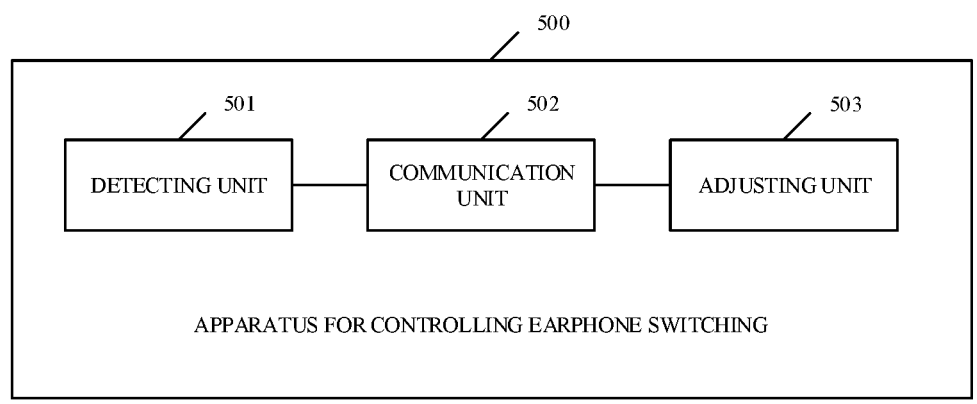
FIG. 5B is a schematic structural diagram illustrating an apparatus for controlling earphone switching according to another embodiment of the present disclosure.

In an embodiment, FIG. 5B illustrates a modification of the apparatus for controlling earphone switching illustrated in FIG. 5A. As illustrated in FIG. 5B, compared with the apparatus illustrated in FIG. 5A, an apparatus illustrated in FIG. 5B further includes an adjusting unit 503.

The adjusting unit 503 is configured to adjust an operating parameter of the first earphone.

In an embodiment, the detecting unit 501 is further configured to determine whether a parameter recovery instruction is received from the second earphone within a preset time period. The adjusting unit 503 is further configured to recover the operating parameter of the first earphone upon determining that the parameter recovery instruction is received. The adjusting unit 503 is further configured to turn off the first earphone upon determining that no parameter recovery instruction is received.

In an embodiment, when the detecting unit 501 determines that the first earphone is switched to the wearing state from the non-wearing state, the communication unit 502 is further configured to send a switching request to the second earphone to request the second earphone to disconnect a second data transmission link with the electronic device, and to establish a first data transmission link with the electronic device.

It can be seen, power consumption of the first earphone can be reduced by adjusting the operating parameter of the first earphone. In addition, switching between master and slave earphones can be achieved according to the changes between these two states, which improves user experience.

According to embodiments of the disclosure, a computer storage medium is further provided. The computer storage medium is configured to store computer programs for electronic data interchange. The computer programs are operable with a computer to perform all or part of the operations of any of the methods described in the foregoing method embodiments. "Computer" referred to herein includes a wireless earphone.

According to embodiments of the present disclosure, a computer program product is further provided. The computer program product includes a non-transitory computer readable storage medium configured to store computer programs. The computer programs are operable with a computer to perform all or part of the operations of any of the methods described in the foregoing method embodiments. The computer program product may be a software installation package. The computer includes a wireless earphone.

It is to be noted that, for the sake of simplicity, the foregoing method embodiments are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual embodiments, for example, multiple units or assemblies may be combined or may be integrated into another system, or some features may be ignored or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various embodiments of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the steps of the various methods of the embodiments described above may be accomplished by means of a program to instruct associated hardware, and the program may be stored in a computer-readable memory, which may include a flash memory, a ROM, a RAM, a magnetic disk, or a CD, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling earphone switching, comprising:
    determining, by a first earphone, whether the first earphone is switched to a non-wearing state from a wearing state, the first earphone being coupled with a second earphone and an electronic device and serving as a master earphone, and the second earphone serving as a slave earphone;
    switching, by the first earphone; the first earphone to serve as the slave earphone and switching, by the first earphone, the second earphone to serve as the master earphone, in response to determining that the first earphone is switched to the non-wearing state from the wearing state, wherein the first earphone and the second earphone remain coupled with one another;
    after the first earphone is switched to the non-wearing state from the wearing state, adjusting, by the first earphone, an operating parameter of the first earphone;
    determining, by the first earphone, whether a parameter recovery instruction is received from the second earphone within a preset time period, wherein the first earphone and the second earphone remain coupled with one another; and
    recovering, by the first earphone, the operating parameter of the first earphone upon determining that the parameter recovery instruction is received;
    wherein determining, by the first earphone, whether the first earphone is switched to the non-wearing state from the wearing state comprises:
    determining a degree of fit between the first earphone and a user's ear;
    determining that the first earphone is in the wearing state when the degree of fit is smaller than a preset threshold; and
    determining that the first earphone is in the non-wearing state when the degree of fit is greater than or equal to the preset threshold; and
    wherein determining the degree of fit between the first earphone and the user's ear comprises:

detecting a barometric pressure value between the first earphone and the user's ear, and determining, according to a preset mapping relationship between barometric pressure values and degrees of fit, the degree of fit corresponding to the barometric pressure value.

2. The method of claim 1, wherein switching the first earphone to serve as the slave earphone and switching the second earphone to serve as the master earphone comprises:
disconnecting a first data transmission link with the electronic device, and sending a request to the second earphone to request the second earphone to establish a second data transmission link with the electronic device.

3. The method of claim 1, wherein switching the first earphone to serve as the slave earphone and switching the second earphone to serve as the master earphone comprises:
sending a request to the electronic device to request the electronic device to establish a second data transmission link with the second earphone, and disconnecting a first data transmission link with the electronic device.

4. The method of claim 1, wherein switching the first earphone to serve as the slave earphone and switching the second earphone to serve as the master earphone comprises:
sending a request to the electronic device to request the electronic device to disconnect a first data transmission link with the first earphone and establish a second data transmission link with the second earphone.

5. The method of claim 1, further comprising:
acquiring acceleration data with an acceleration sensor of the first earphone; and one of:
determining that the first earphone is in the non-wearing state, when the acceleration data satisfies a preset condition; or
determining that the first earphone is in the wearing state, when the acceleration data does not satisfy the preset condition.

6. The method of claim 1, further comprising:
detecting, with a sensor of the first earphone, a distance between the first earphone and a user's ear; and one of:
determining that the first earphone is in the wearing state, upon detecting that the distance is shorter than a preset distance; or
determining that the first earphone is in the non-wearing state, upon detecting that the distance is longer than or equal to the preset distance.

7. The method of claim 1, wherein:
determining whether the parameter recovery instruction is received from the second earphone within the preset time period comprises:
determining whether the parameter recovery instruction is received from the second earphone within the preset time period after receiving a notification information indicative of that the second earphone is switched to serve as the master earphone.

8. The method of claim 1, further comprising:
after switching the first earphone to serve as the slave earphone:
sending a switching request to the second earphone to request the second earphone to disconnect a second data transmission link with the electronic device, upon determining that the first earphone is switched to the wearing state from the non-wearing state; and
establishing a first data transmission link with the electronic device.

9. The method of claim 1, further comprising:
turning off, by the first earphone, the first earphone upon determining that no parameter recovery instruction is received.

10. The method of claim 1, wherein adjusting, by the first earphone, the operating parameter of the first earphone after the first earphone is switched to the non-wearing state from the wearing state comprises:
adjusting the operating parameter of the first earphone when the first earphone is switched to serve as the slave earphone and the second earphone is switched to serve as the master earphone; or
adjusting the operating parameter of the first earphone when the first earphone is switched to serve as the slave earphone; or
adjusting the operating parameter of the first earphone when the first earphone is switched to the non-wearing state from the wearing state.

11. An earphone, comprising:
at least one processor; and
a computer readable storage, coupled to the at least one processor and storing at least one computer executable instruction thereon which, when executed by the at least one processor, causes the at least one processor to carry out actions comprising:
determining whether the earphone is switched to a non-wearing state from a wearing state, the earphone being coupled with another earphone and an electronic device and serving as a master earphone, and the other earphone serving as a slave earphone;
switching the earphone to serve as the slave earphone and switching the other earphone to serve as the master earphone, in response to determining that the earphone is switched to the non-wearing state from the wearing state, wherein the earphone and the other earphone remain coupled with one another;
after the earphone is switched to the non-wearing state from the wearing state, adjusting, by the earphone, an operating parameter of the earphone;
determining, by the earphone, whether a parameter recovery instruction is received from the other earphone within a preset time period, wherein the earphone and the other earphone remain coupled with one another; and
recovering, by the earphone, the operating parameter of the earphone upon determining that the parameter recovery instruction is received;
wherein the at least one processor configured to carry out determining whether the earphone is switched to the non-wearing; state from the wearing state is configured to carry out actions, comprising:
determining a degree of fit between the earphone and a user's ear;
determining that the earphone is in the wearing state when the degree of fit is smaller than a preset threshold; and
determining that the earphone is in the non-wearing state when the degree of fit is greater than or equal to the preset threshold; and
wherein the at least one processor configured to carry out determining the degree of fit between the earphone and the user's ear is configured to carry out actions comprising:
detecting a barometric pressure value between the earphone and the user's ear, and determining, according to a preset mapping relationship between barometric pressure values and degrees of fit, the degree of fit corresponding to the barometric pressure value.

12. The earphone of claim 11, wherein the at least one processor configured to carry out switching the earphone to serve as the slave earphone and switching the other earphone to serve as the master earphone is configured to carry out actions comprising:
  disconnecting a first data transmission link with the electronic device, and sending a request to the other earphone to request the other earphone to establish a second data transmission link with the electronic device.

13. The earphone of claim 11, wherein the at least one processor configured to carry out switching the earphone to serve as the slave earphone and switching the other earphone to serve as the master earphone is configured to carry out actions comprising:
  sending a request to the electronic device to request the electronic device to establish a second data transmission link with the other earphone, and disconnecting a first data transmission link with the electronic device.

14. The earphone of claim 11, wherein the at least one processor configured to carry out switching the earphone to serve as the slave earphone and switching the other earphone to serve as the master earphone is configured to carry out actions comprising:
  sending a request to the electronic device to request the electronic device to disconnect a first data transmission link with the earphone and establish a second data transmission link with the other earphone.

15. The earphone of claim 11, wherein the at least one processor configured to carry out the action of determining whether the parameter recovery instruction is received from the other earphone within the preset time period is configured to carry out an action comprising:
  determining whether the parameter recovery instruction is received from the other earphone within the preset time period after receiving a notification information indicative of that the other earphone is switched to serve as the master earphone.

16. The earphone of claim 11, wherein the at least one processor is further configured to carry out actions comprising:
  sending a switching request to the other earphone to request the other earphone to disconnect a second data transmission link with the electronic device, upon determining that the earphone is switched to the wearing state from the non-wearing state; and
  establishing a first data transmission link with the electronic device.

17. An earphone system, comprising a first earphone and a second earphone with only one of them being capable of coupling with an electronic device at a time, the first earphone being currently coupled with the electronic device and the second earphone and comprising:
  at least one processor; and
  a computer readable storage, coupled to the at least one processor and storing at least one computer executable instruction thereon which, when executed by the at least one processor, causes the at least one processor to:
  determine whether the first earphone is switched to a non-wearing state from a wearing state;
  disconnect a first data transmission link between the first earphone and the electronic device and establish a second data transmission link between the second earphone and the electronic device, in response to determining that the first earphone is switched to the non-wearing state from the wearing state, wherein the first earphone and the second earphone remain coupled with one another;
  after the first earphone is switched to the non-wearing state from the wearing state, adjust an operating parameter of the first earphone;
  determine whether a parameter recovery instruction is received from the second earphone within a preset time period, wherein the first earphone and the second earphone remain coupled with one another; and
  recover the operating parameter adjusted upon determining that the parameter recovery instruction is received;
  wherein the at least one processor configured to determine whether the first earphone is switched to the non-wearing state from the wearing state is configured to:
  determine a degree of fit between the first ear hone and a user's ear;
  determine that the first earphone is in the wearing state when the degree of fit is smaller than a reset threshold; and
  determine that the first earphone is in the non-wearing state when the degree of fit is greater earphone and the user's ear is configured to:
  detect a barometric pressure value between the first earphone and the user's ear, and determining, according to a preset mapping relationship between barometric pressure values and degrees of fit, the degree of fit corresponding to the barometric pressure value.

18. The earphone system of claim 17, wherein the at least one processor configured to determine whether the parameter recovery instruction is received from the second earphone within the preset time period is configured to:
  determine whether the parameter recovery instruction is received from the second earphone within the preset time period after receiving a notification information indicative of that the second earphone is switched to serve as a master earphone.

* * * * *